United States Patent
Arunkumar et al.

(10) Patent No.: US 10,057,276 B2
(45) Date of Patent: Aug. 21, 2018

(54) GLOBAL ATTESTATION PROCEDURE

(71) Applicant: INTERNATIONAL BUSINESS MACHINES CORPORATION, Armonk, NY (US)

(72) Inventors: Saritha Arunkumar, Basingstoke (GB); Diyanesh B. Chinnakkonda Vidyapoornachary, Bangalore (IN); Saravanan Sethuraman, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/268,897

(22) Filed: Sep. 19, 2016

(65) Prior Publication Data
US 2018/0083981 A1 Mar. 22, 2018

(51) Int. Cl.
*H04L 29/06* (2006.01)
*G06F 17/30* (2006.01)

(52) U.S. Cl.
CPC ...... *H04L 63/107* (2013.01); *G06F 17/30241* (2013.01); *G06F 17/30864* (2013.01); *H04L 63/06* (2013.01); *H04L 63/10* (2013.01)

(58) Field of Classification Search
CPC ....... H04L 63/10; H04L 63/105; H04L 63/06; H04L 63/107; G06F 17/30241; G06F 17/30864
See application file for complete search history.

(56) References Cited

U.S. PATENT DOCUMENTS

| 7,308,272 B1* | 12/2007 | Wortham | G01S 19/17 342/357.55 |
| 2006/0112418 A1* | 5/2006 | Bantz | G06F 21/88 726/4 |
| 2012/0159156 A1 | 6/2012 | Barham et al. | |

(Continued)

OTHER PUBLICATIONS

Peter Mell et al., "The NIST Definition of Cloud Computing", National Institute of Standards and Technology, U.S. Department of Commerce, NIST Special Publication 800-145, Sep. 2011, 7 pages.

*Primary Examiner* — Robert Leung
*Assistant Examiner* — Ayoub Alata
(74) *Attorney, Agent, or Firm* — Heslin Rothenberg Farley & Mesiti P.C.

(57) ABSTRACT

A method, computer program product, and system for authenticating a computing device by geographic attestation includes a processor utilizing executing an authentication application utilizing location services executing on the computing device to obtain location data from the location services. The processor obtains the location data and creates and encodes a data structure in a secured area of a memory; the data structure is only accessible to the authentication application. The processor transmits to an authentication server, an authentication request that includes the encoded location data, requesting access to secure content. The processor obtains a request to query identifiers proximate to the computing device for additional location information and queries the identifiers and transmits this additional location information to the authentication server. The processor receives a notification and based on obtaining the notification, erases the secured area and turns off the location services on the computing device.

18 Claims, 6 Drawing Sheets

(56) References Cited

U.S. PATENT DOCUMENTS

| | | | |
|---|---|---|---|
| 2012/0255026 A1* | 10/2012 | Baca | G06F 21/10 |
| | | | 726/26 |
| 2015/0007296 A1* | 1/2015 | Auger | G06K 5/00 |
| | | | 726/7 |
| 2015/0019254 A1* | 1/2015 | Ibikunle | G06F 21/6245 |
| | | | 705/3 |
| 2016/0050066 A1 | 2/2016 | Loizides | |
| 2016/0065589 A1 | 3/2016 | Leighton et al. | |
| 2016/0128017 A1 | 5/2016 | Qiu et al. | |

* cited by examiner

GLOBAL ATTESTATION PROCEDURE

BACKGROUND

Geographic attestation, i.e., the confirmation of a location of a user, can be utilized as a boundary for this user to access protected data. For example, the access of users to their medical records is can be enabled or denied based on the location of the user. In some existing systems, users who want to access to their medical account information must be on a hospital premise to do so.

SUMMARY

Shortcomings of the prior art are overcome and additional advantages are provided through the provision of a computer program product for authenticating a computing device to access secure content using global attestation. The computer program product comprises a storage medium readable by a processing circuit and storing instructions for execution by the processing circuit for performing a method. The method includes, for instance: utilizing, by one or more processors on a computing device, executing one or more programs of an authentication application, location services executing on the computing device to obtain location data from the location services. Based on obtaining the location data, creating and encoding, by the one or more processors, a data structure from the location data in a secured area of a memory of the computing device, wherein the data structure is only accessible to the authentication application; transmitting, by the one or more processors, to an authentication server, an authentication request, wherein the authentication request comprises the encoded location data, and the authentication request is a request for access to secure content via the authentication server. Obtaining, by the one or more processors, from the authentication server, a request to query identifiers proximate to the computing device for additional location information; responsive to the request, querying, by the one or more processors, the identifiers for the additional location information and transmitting the additional location information to the authentication server. Obtaining, by the one or more processors, a notification, responsive to the authentication request, from the authentication server. Based on obtaining the notification, erasing, by the one or more processors, the secured area and turning off the location services on the computing device.

Shortcomings of the prior art are overcome and additional advantages are provided through the provision of a method of authenticating a computing device to access secure content using global attestation. The method includes, for instance: utilizing, by one or more processors on a computing device, executing one or more programs of an authentication application, location services executing on the computing device to obtain location data from the location services. Based on obtaining the location data, creating and encoding, by the one or more processors, a data structure from the location data in a secured area of a memory of the computing device, wherein the data structure is only accessible to the authentication application. Transmitting, by the one or more processors, to an authentication server, an authentication request, wherein the authentication request comprises the encoded location data, and the authentication request is a request for access to secure content via the authentication server. Obtaining, by the one or more processors, from the authentication server, a request to query identifiers proximate to the computing device for additional location information. Responsive to the request, querying, by the one or more processors, the identifiers for additional location information and transmitting the additional location information to the authentication server. Obtaining, by the one or more processors, a notification, responsive to the authentication request, from the authentication server. Based on obtaining the notification, erasing, by the one or more processors, the secured area and turning off the location services on the computing device.

Shortcomings of the prior art are overcome and additional advantages are provided through the provision of a system for authenticating a computing device to access secure content using global attestation. The system comprises a memory, a processor in communication with the memory, and program instructions executable by the processor via the memory to perform a method. The method includes, for instance: utilizing, by one or more processors on a computing device, executing one or more programs of an authentication application, location services executing on the computing device to obtain location data from the location services. Based on obtaining the location data, creating and encoding, by the one or more processors, a data structure from the location data in a secured area of a memory of the computing device, wherein the data structure is only accessible to the authentication application. Transmitting, by the one or more processors, to an authentication server, an authentication request, wherein the authentication request comprises the encoded location data, and the authentication request is a request for access to secure content via the authentication server. Obtaining, by the one or more processors, from the authentication server, a request to query identifiers proximate to the computing device for additional location information. Responsive to the request, querying, by the one or more processors, the identifiers for additional location information and transmitting the additional location information to the authentication server. Obtaining, by the one or more processors, a notification, responsive to the authentication request, from the authentication server. Based on obtaining the notification, erasing, by the one or more processors, the secured area and turning off the location services on the computing device.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
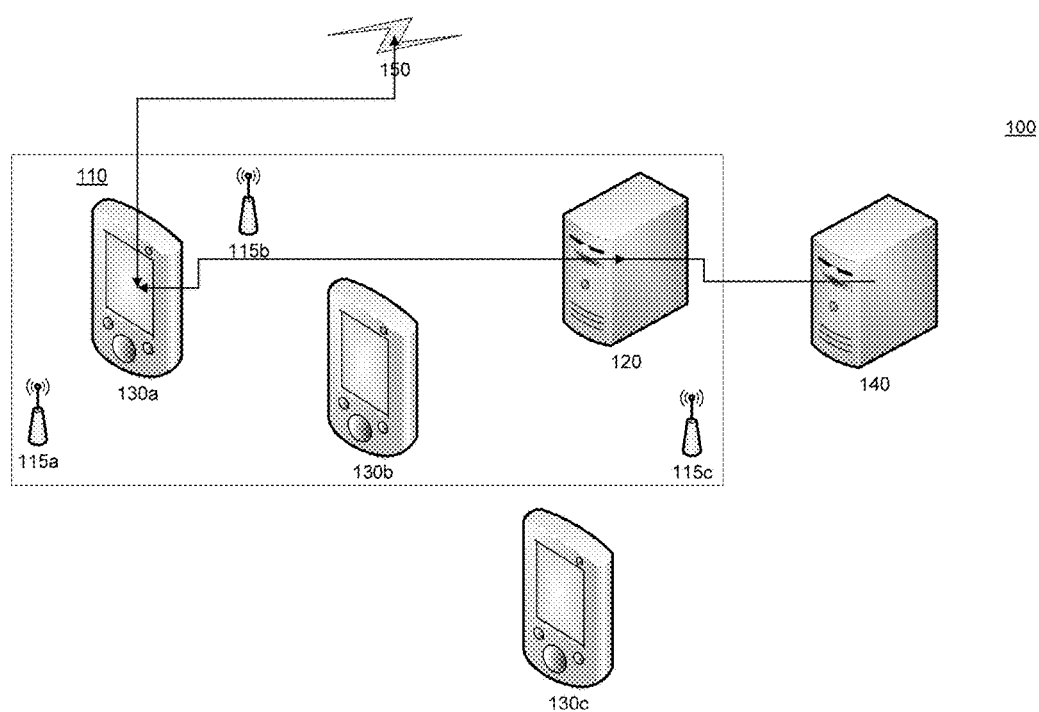
FIG. 1 is a diagram depicting aspects of a technical environment into which aspects of an embodiment of the present technique can be integrated.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
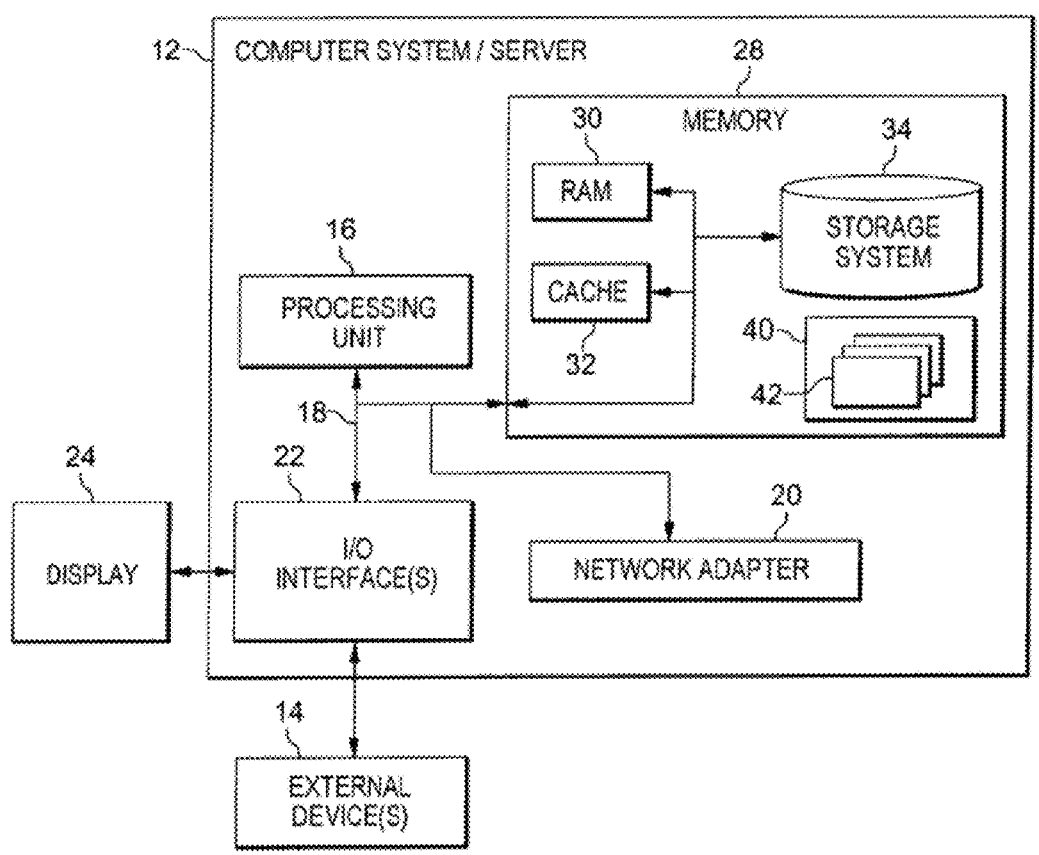
FIG. 4 depicts one embodiment of a cloud computing node.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28.

Current geographic attestation processes are vulnerable to hacking. In current processes, an application determines the location of the user by locating the individual within a virtual polygon to localize the area of presence of the user. In order to access the desired information, the user provides account credentials through a mobile application, along with other key attributes, to an authentication server. The latitudinal and longitudinal coordinates of this user are ascertained and also passed to the server, for example, in secured markup language. Assisting in ascertaining this location information are physical "identifier" devices that are spatially embedded throughout the premise to support verification processes across one or more of the aforementioned polygons. These systems are vulnerable to hacking because a user's account could be hacked by altering the latitudinal and longitudinal coordinate data, which are data that are essential to the authentication of the user. These data are vulnerable to hacking even if the mobile application encodes the data using a Geohash encoding algorithm to protect the information.

Certain embodiments of the present invention provide advantages over known global attestation procedures. As aforementioned, applications that require certain geographical/location information in order to access secure information are susceptible to malicious accesses of the location information, compromising the security of the data protected by the geographic attestation requirement. Certain embodiments of the present invention prevent accesses to and guard the authenticity of geographic information that is utilized as part of an authentication process, in order to prevent sensitive data from being compromised and therefore serve to optimize global attestation procedures to enable robust security to avoid the possibility of hacking, without modifying the hardware of existing computing environments that perform global attestation. To this end, certain embodiments of the present invention may include improvements to this computing technology.

In order to improve data security computer technology, certain embodiments of the present invention include an improvement that is inextricably tied to computer technology, specifically, one or more programs obtain location data, for example, using a Global Positioning System (GPS) and use this location data to create a data structure within a secured area of a computing devices. This secured area can be referred to as an "invisible memory area" because the area of the memory in which the one or more programs store the location information is only accessible to an authentication application, but not to any other application executing on the computing device.

In an embodiment of the present invention, one or more programs may store geographic/location data in a secured memory area and further protect the integrity and security of the data by generating an encryption key along with the location data.

In addition to storing geographical/location data in a secured memory area and encrypting this data (generating a key at the time of storage), embodiments of the present invention may further secure this data and prevent the data from being obtained by malicious accesses by matching, authorizing and erasing the data when the location information is acquired by an authorized authentication server, In certain embodiments of the present invention, once accesses to secure data by a computing device are authorized by an authentication server, and then one or more programs turn off the GPS services of the computing device to save power and to prevent additional attempts at obtaining the location data.

FIG. 1 is a diagram that illustrates certain aspects of a computing environment 100 into which aspects of some embodiments of the present invention can be implemented and utilized. Denoted in FIG. 1 is a polygon 110 that defines an area and as long as a computing device is located at latitudinal and longitudinal coordinates that fall within the area of the polygon 110, the device is at a geographic location that could be authorized by a geographic attestation process to access the secure content 140 (e.g., medical records) to which an authentication server 120 serves as a gatekeeper. As understood by one of skill in the art, validation through geographic attestation may be only a portion of the authentications required for one or more programs executing on the authentication server 120 to permit an authorized user device 130a-130b in the polygon to access the secure content 140. For example, one or more programs executing on the user devices that pass the geographic attestation stage of an authorization may also be required, by the authentication server 120 to supply additional credentials.

To illustrate how the polygon 110 defines an authorized geographic location, FIG. 1 depicts more than one mobile device, a first user device 130a, a second user device 130b, and a third user device 130c. The first user device 130a and the second user device 130b are at locations from which the authentication server 120 could permit one or more programs executing on these user devices 130a-130b to access the secure content 140. However, the third user device 130c is at a location from which the authentication server 120 would not permit access to the secure content 140, as the third user device 130c would fail the geographic attestation process by being outside of the polygon 110. Physical identifiers 115a-115c are spatially embedded throughout the premise, and depicted in FIG. 1 in polygon 110, to support verification processes across the polygon 110.

FIG. 1 depicts the authentication server 120 as being inside the polygon 110 and the secure content 140 as being outside of the polygon 110, as merely one example of a possible configuration of a technical environments that utilizes aspects of an embodiment of the present invention. The locations of authentication server 120 and the secure content 140 may vary across various embodiments of the present invention. For example, the authentication server 120 and the secure content 140 may be located on the same physical machine, in an embodiment of the present invention or the secure content 140 may reside on a different physical machine than the authentication server 120 that is accessible to the authentication server 120. Also, although portrayed as a single entity, for ease of understanding, the one or more of authentication server 120 and/or the secure content 140 may be comprised of more than one physical computing node. For example, both authentication and storing of secure content, in an embodiment of the present invention, may be handled by various computing resources over a distributed computing environment, including but not limited to, a cloud computing environment.

As discussed above, in an embodiments of the present invention, the authentication server 120 utilizes the geographic location of a user device 130a-130c as at least part of the criteria in determining whether to authorize the device to access the secure content 140. As illustrated in reference to the first user device 130a, each user device may include a location device or service 132a (e.g., a GPS module) that when enabled includes program code that communicates with a GPS satellite 150 in order to determine the latitudinal and longitudinal location of the device. Program code executing on a device or on a computing node with access to a device, may enable and disable the location device or service 132a in a given device.

Figure 2:
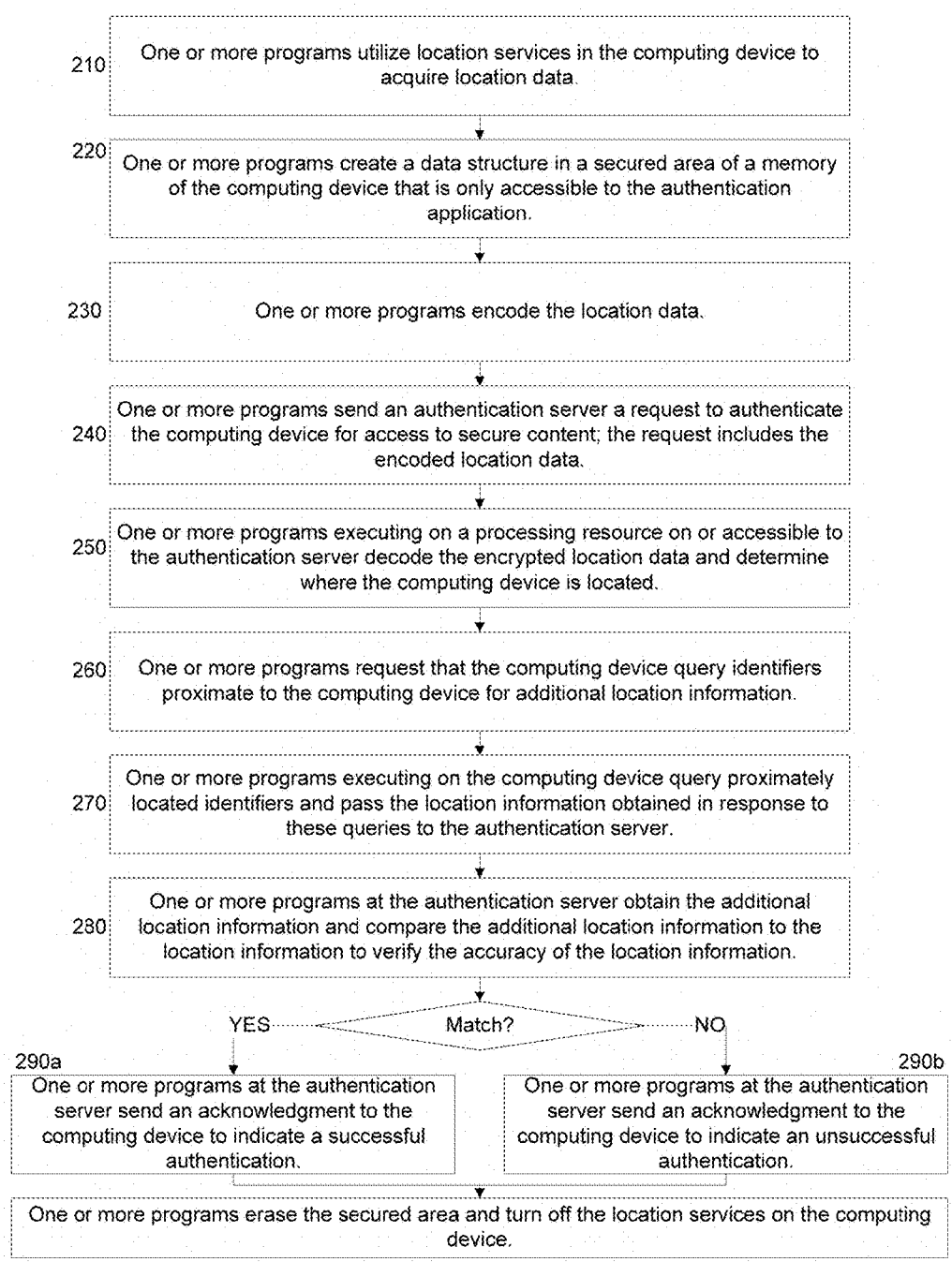
FIG. 2 depicts a workflow illustrating certain aspects of an embodiment of the present invention.

FIG. 2 depicts a workflow 200 of an embodiment of the present invention. Throughout the explanation of this workflow 200 references are made to elements of FIG. 1 in order to assist in illustrating certain aspects of embodiments of the present invention.

In an embodiment of the present invention, in order for a computing device (e.g., FIG. 1, 130a) to be authenticated by an authentication server (e.g., FIG. 1, 120) to access secure content (e.g., FIG. 1, 140), program code executed by one or more processors of the computing device that is part of an authentication application utilizes location services (e.g., a GPS module) in the computing device to acquire location data (210). In an embodiment of the present invention, the program code may enable the location services, which communicate with a GPS satellite and utilize the data from the GPS satellite to determine the location of the computing device. The program code obtains the location data from the location services.

Returning to FIG. 2, upon obtaining the location data, the program code creates a data structure in a secured area of a memory of the computing device that is only accessible to the authentication application (220). The program code encodes the location data by applying a desired level of encryption (230). In an embodiment of the present invention, the secured area of the memory can be understood as an "invisible memory area" because it is only visible to the program code associated with the authentication application and cannot be accessed by other applications executing on the computing device. In an embodiment of the present invention, the secured area of the memory in which the program code stores the location information is owned only by the authentication application and the user of the computing device cannot access and therefore, alter, the data acquired via the location services. In an embodiment of the present invention, the secured area is part of Non-Volatile Memory accessible to the application or Flash backed Dynamic Random Access Memory (DRAM). In an embodiment of the present invention, the secured memory area is a Non-Volatile Dual In-line Memory Module (NVDIMM) in the Flash backed DRAM memory and is only accessible to the authentication application because it is locked by the program code erases the data before the release of the memory area. In an embodiment of the present invention, after the program code stores the location information in the secured area, the information only remains in the stored area for a short amount of time, for example, because the program code deletes the information after the computing device is successfully authenticated.

As aforementioned, the program code of the authentication application locked the secured area so that no other application can access the stored location data. In various embodiments of the present invention, the program code may utilize differing methods to lock the secured area. In an embodiment of the present invention, the program code encrypts and stores the location data and sends an encrypted key using MRS commands to DRAM and its content is backed up with Flash memory. In embodiments that utilize this form of locking, only when the key is matching will the memory controller of the device enable the content to be opened by the program code. The memory controller will generate different keys each time the program code stores location data, to ensure that the location data is not hacked. In an embodiment of the present invention, the memory controller can generate various keys based on the timestamps of the times of storage of the location data. In an embodiment of the present invention, the secured area of the memory is locked because the aforementioned Flash memory part is protected by the Operating System (OS). In an embodiment of the present invention, the secured area of the memory comprises a new data structure, which can be understood by the authentication application and access is provided by the memory controller only when the authentication is successful.

In an embodiment of the present invention, the Flash memory address is fixed, so whenever the authentication application is invoked, it will assume that the data was acquired from the GPS, processed, encrypted, and stored in the secured section, and then it will try to authenticate. If it is successful, the OS or the application will be able to access the location data different methods. In an embodiment of the present invention, if an attempt is made by a program to access the secure area without the correct encrypted key, one or more programs executed by the computing device, including but not limited to the firmware of the computing device, will automatically erase the location data.

Returning to FIG. 2, in an embodiment of the present invention, the program code sends an authentication server (e.g., FIG. 1, 120) a request to authenticate the computing device (e.g., FIG. 1, 130a) for access to secure content; the request includes the encoded location data (240). In an embodiment of the present invention, the program code may also send additional data, including credential information, to the authentication server, together with the encoded location data from the invisible memory.

Upon receipt of the encoded location data, one or more programs executing on a processing resource on or accessible to the server decode the encrypted location data and determine where the computing device is located (250). For example, the program code may determine the polygon in which the computing device is located, according to the location data received by the authentication server.

One the program code has decrypted the location information, it attempts to authentication accuracy of the information. The program code requests that the computing device query identifiers (e.g., FIG. 1, 115a-c) proximate to the computing device for additional location information (260). One or more programs executing on the computing device query proximately located identifiers and pass the location information obtained in response to these queries to the authentication server (270). If the location data supplied by the computing device to the authentication server is accurate, identifiers proximate to the computing device should supply location credentials that situate the identifiers in the same polygon as the computing devices. One or more programs at the authentication server obtain this additional location information and compare the additional location information to the location information to verify the accuracy of the location information (280).

Based on the location information matching the additional location information (e.g., both the computing device and the identifiers indicating locations with the same polygon) one or more programs at the authentication server send an acknowledgment to the computing device to indicate a successful authentication (290a). Once the authentication server has authenticated the computing device, the authentication server enables queries originating from the computing device to access the secure content. Based on receiving the authentication, the program code of the authentication application erases the secured area and turns off the location services on the computing device (295).

Based on the location information not matching the additional location information, the one or more programs at the authentication server send an acknowledgment to the computing device to indicate that the authentication is not successful (290b). Based on receiving this response, the program code of the authentication application erases the secured area and turns off the location services on the computing device (295). In an embodiment of the present invention, the program code may attempt to authenticate the computing device after an unsuccessful authentication by requesting location data from the computing device and/or additional location data from the identifiers via the location device a predefined amount of times before determining that the authentication is unsuccessful and sending the notification to the computing device.

Aspects of certain embodiments of the present invention enhance geographic attestation by introducing heightened security into this type of authentication. For example, in embodiments of the present invention, the workflow depicted as FIG. 2 is accomplished in a manner that is not visible to the user of the computing device (e.g., FIG. 1, 130a). Additionally, because the secured area of the memory of the computing device, where the program code stores the location data retrieved by the location services of the computing device, is exclusive to the authentication application, the user of the computing device cannot alter the location data because the user cannot access this area of the memory nor could a hacker access this area to make changes to the location data, for example, the latitudinal and longitudinal values. Because the location data is obtained by the application via location services on the computing device that access a GPS satellite, the location services (e.g., GPS module) the location data are robust (and reliable) data points. In addition to being accessible exclusively to the authentication application, in embodiments of the present invention, the secure memory area and the data within is accessible with encrypted keys and if accesses are attempted without the proper credentials, the firmware deletes the contents of the secure area automatically. As seen in the workflow 200 of FIG. 1, aspects of an embodiment of the present invention are atomic and the processes described are atomic and include no hooks that user could utilize to change the described protocol. Embodiments of the present invention can be implemented in existing computing environments because the aspects described do not require additional hardware components and can be accomplished by the firmware of the computing device and the authentication server and/or an application running on the OS of one or more of these computing nodes.

Figure 3:
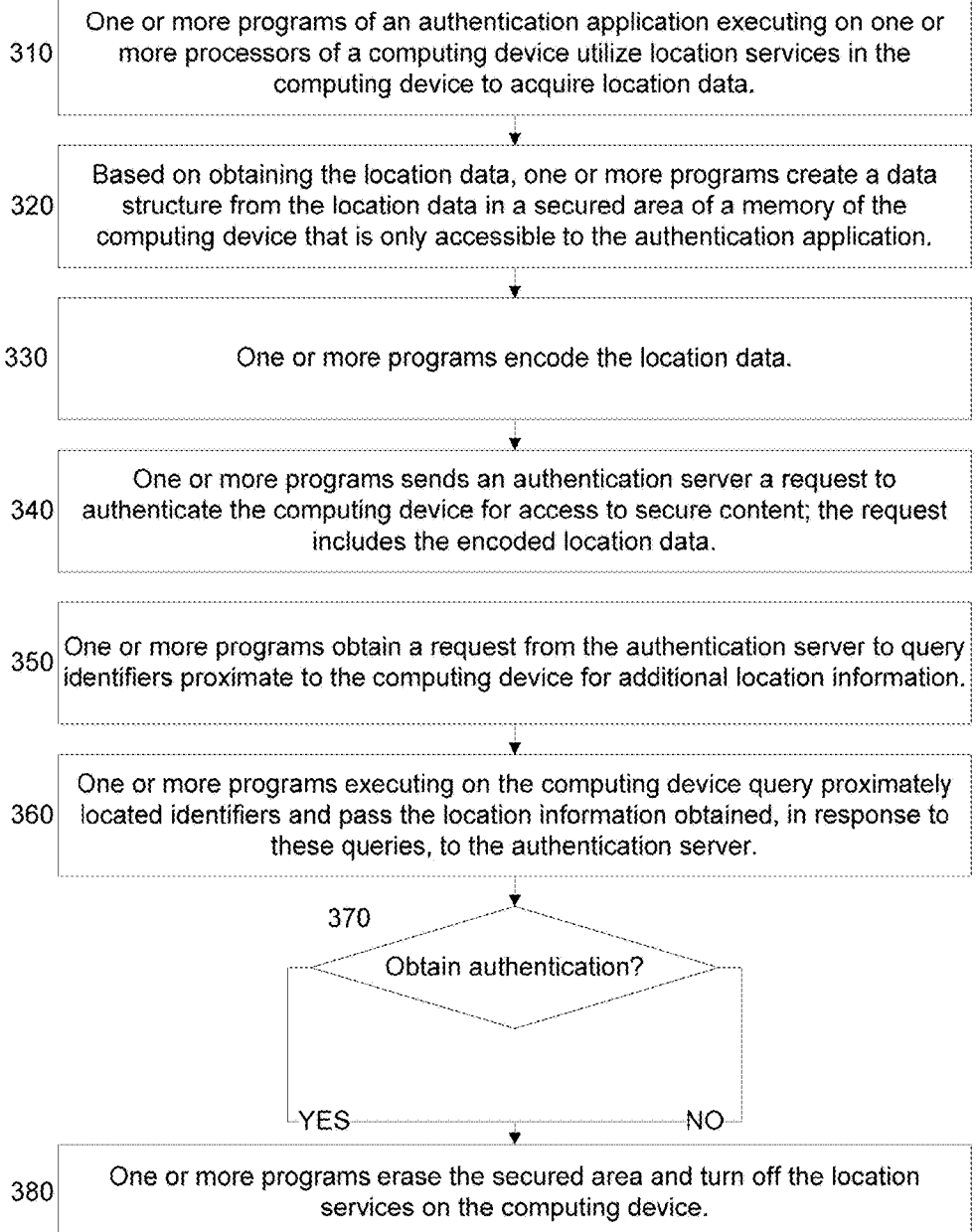
FIG. 3 depicts a workflow illustrating certain aspects of an embodiment of the present invention.

FIG. 3 is a workflow 300 that depicts certain aspects of an embodiment of the present invention from the vantage point of a computing device seeking authentication to access secure content. In an embodiment of the present invention, program code of an authentication application executing on one or more processors of a computing device utilizes location services in the computing device to acquire location data (310). In an embodiment of the present invention, the program code may request a GPS module to communicate with a GPS satellite in order to obtain the latitudinal and longitudinal location of the computing device. Based on obtaining the location data, the program code creates a data structure from the location data in a secured area of a memory of the computing device that is only accessible to the authentication application (320). In an embodiment of the present invention, the program code encodes the location data (330). When encoding the location data, the program code may generate an encryption key that the authentication application can utilize to access the data. In the event that a process attempts to access the data with an incorrect key, in an embodiment of the present invention, the program code deletes the data structure.

Returning to FIG. 3, in an embodiment of the present invention, program code sends an authentication server a request to authenticate the computing device for access to secure content; the request includes the encoded location data (340). Responsive to sending this request, in an embodiment of the present invention, the program code obtains a request from the authentication server to query identifiers proximate to the computing device for additional location information (350). The program code queries proximately located identifiers and passes the location information obtained, in response to these queries, to the authentication server (360). Responsive to the submission of the additional location information, in an embodiment of the present invention, the computing device either obtains a notification from the authentication server and is able to access the secure content after receiving the notification or the computing device receives a notification that it has not been authenticated and is therefore unable to access the secure content (370).

Whether or not the computing device is authorized to access the secure content, responsive to receiving the notification, in an embodiment of the present invention, the program code erases the secured area and turns off the location services on the computing device (380).

In an embodiment of the present invention, an OS can read the secured area (e.g., a Flash private memory) only if authorized and the information required for this authorization to occur is only available to the authentication application, which is executed by the OS. In an embodiment of the present invention, the program code sends the location data DRAM through an MRS command. If it is authenticated, then program code in the DRAM will process the data as the location data is encrypted in this embodiments of the present invention when it is in DRAM. From DRAM, the program code moves the location data to Flash, which is a NVDIMM that can back up the data. Because this information is hard-coded, in this embodiment of the present invention, the memory controller or the computing device knows in which block address to store this location data and it will create a new secured data structure for the authentication application to access. When the authentication application or the OS needs to access this data, it needs to authenticate first with DRAM if it's successful, then program code in DRAM moves control to a secondary memory wherein the location data can be read, for example, based on a partial restore function in NVDIMM, and takes the location data and puts this data into DRAM for the application to utilize. Once a process is complete, for example, an authentication has succeeded or failed, the program code of the memory controller erases the secured memory and the same area can be used for different purpose. In another embodiment of the present invention, although the contents of the memory are erased, the memory controller may preserve the memory location for future uses by the authentication application, depending on the memory availability.

In an embodiment of the present invention Abstraction Layer Application Programming Interfaces (APIs) are utilized by the program code to read hardware registers in the computing device and access memory content directly from OS. In this embodiment of the present invention, program code is able to read the secured content of the Flash memory after authentication in DRAM. Specifically, after authentication in DRAM, the hardware automatically restores the content of Flash memory into DRAM and then the memory controller takes the location data from predetermined address of DRAM (e.g., unused MRS register and through MPR read) and pushes the data into a hardware register which can be read by the OS.

An embodiment of the present invention includes a computer-implemented method where program code of an authentication application executed by one or more processors of a computing devices, utilizes location services on a computing device to obtain location data from the location services, Based on obtaining the location data, the program code creates and encodes a data structure from the location data in a secured area of a memory of the computing device, wherein the data structure is only accessible to the authentication application. The program code transmits, to an authentication server, an authentication request, where the authentication request includes the encoded location data, and the authentication request is a request for access to secure content via the authentication server. The program code obtains, from the authentication server, a request to query identifiers proximate to the computing device for additional location information. Responsive to the request, the program code queries the identifiers for the additional location information and transmits the additional location information to the authentication server. The program code obtains a notification, responsive to the authentication request, from the authentication server and based on obtaining the notification, the program code erases the secured area and turns off the location services on the computing device.

In an embodiment of the present invention, prior to utilizing the location services, the program code initiates the location services on the computing device.

In an embodiment of the present invention, the authentication server decodes the encoded location information and compares the location information to the additional location information to determine if the location information and the additional location information indicate locations in a similar geographic area.

In an embodiment of the present invention, the location information includes a latitudinal coordinate and a longitudinal coordinate, describing a position of the computing device. In an embodiment of the present invention, the various location information is in a similar geographic area when the latitudinal coordinate and the longitudinal coordinate describing the position of the computing device indicate a location in a virtual polygon defining a geographic area and the additional location information comprises latitudinal coordinates and longitudinal coordinates indicating additional locations in the virtual polygon.

In an embodiment of the present invention, the notification is either an authorization to access the secured content or a denial of access to the secured content. In an embodiment of the present invention, when the notification comprises the authorization to access the secured content, the program code accesses a portion of the secured content via the authentication server.

In an embodiment of the present invention, the encoding includes generating an encryption key, wherein the authentication application utilizes the encryption key to access the data. In this embodiment, prior to obtaining the notification, the program code may obtain an access request to access the data structure in the secured area of the memory, where the access request does not comprise the encryption key. In this situation, the program code may delete the data structure.

In an embodiment of the present invention, the secured area of the memory is either a portion of Non-Volatile Memory or Flash backed Dynamic Random Access Memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, both the user computing devices 130a-130c (FIG. 1) and the authentication server 120 (FIG. 1), can be understood as cloud computing node 10 (FIG. 6) and if not a cloud computing node 10, then a general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 5:
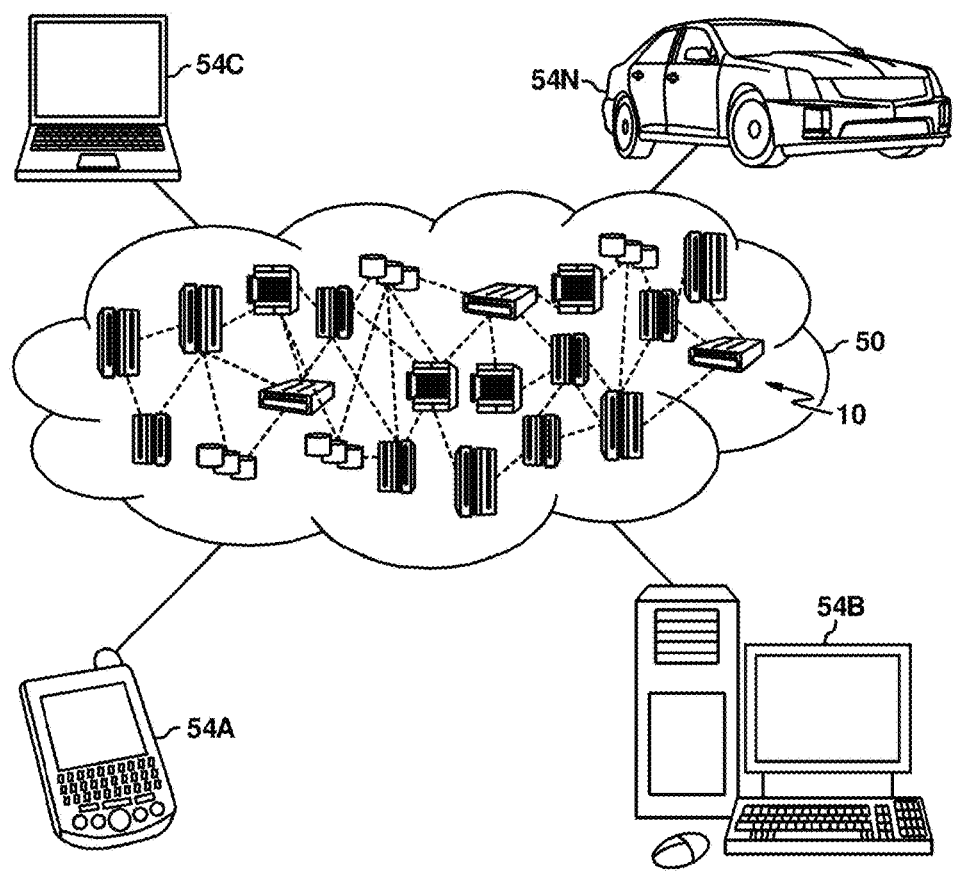
FIG. 5 depicts one embodiment of a cloud computing environment.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
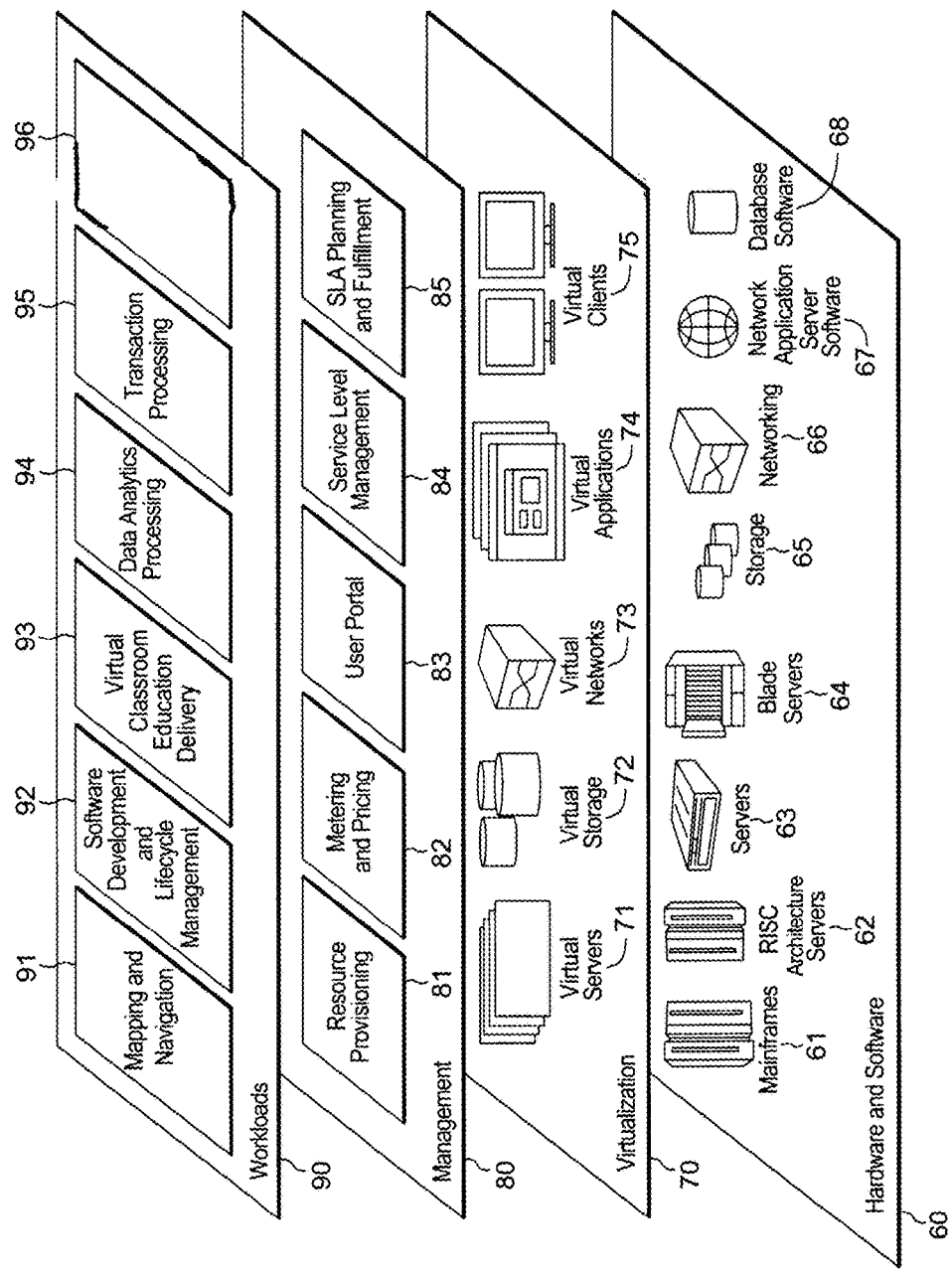
FIG. 6 depicts one example of abstraction model layers.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below, which may include maintaining VPD at a VPD location the computer system. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating authenticating a user to access secure content.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising: utilizing, by one or more processors on a computing device, executing one or more programs of an authentication application, location services executing on the computing device to obtain location data from the location services, wherein the location data indicates a physical location of the computing device contemporaneously with the executing; based on obtaining the location data, creating and encoding, by the one or more processors, a data structure from the location data in a secured area of a memory of the computing device, wherein the data structure is only accessible to the authentication application, wherein the encoding comprises generating an encryption key at a time of storing the location data structure, wherein the encryption key is generated based on timestamp of time of storing the location data structure into the secured area of the memory, and wherein the encryption key is utilized to encrypt the data structure; transmitting, by the one or more processors, to an authentication server, an authentication request, wherein the authentication request comprises the encoded location data, and the authentication request is a request for access to secure content via the authentication server; obtaining, by the one or more processors, from the authentication server, a request to query identifiers geographically proximate to the computing device for additional location information, wherein geographically proximate to the computing device comprises within a pre-defined perimeter around the physical location of the computing device; responsive to the request, querying, by the one or more processors, the identifiers for the additional location information, wherein the additional location information comprises location data originating from each of the identifiers, indicating a location of each of the identifiers, and transmitting the additional location information to the authentication server; obtaining, by the one or more processors, a notification, responsive to the authentication request, from the authentication server; and based on obtaining the notification, erasing, by the one or more processors, the secured area and turning off the location services on the computing device.

2. The computer-implemented of claim 1, further comprising: prior to utilizing the location services, initiating, by the one or more processors, the location services on the computing device.

3. The computer-implemented method of claim 1, wherein the authentication server decodes the encoded location data and compares the decoded location data to the additional location information to determine if the decoded location data and the additional location information indicate locations in a similar geographic area, wherein the similar geographic area comprises the pre-defined perimeter around the physical location of the computing device.

4. The computer-implemented method of claim 3, wherein the decoded location data comprises a latitudinal coordinate and a longitudinal coordinate, describing a position of the computing device comprising the physical location of the computing device.

5. The computer-implemented method of claim 4, wherein the decoded location data and the additional location information indicate locations in the similar geographic area when the latitudinal coordinate and the longitudinal coordinate describing the position of the computing device indicate a location in a virtual polygon defining a geographic area and the additional location information comprises latitudinal coordinates and longitudinal coordinates indicating additional locations in the virtual polygon, wherein a perimeter of the virtual polygon comprises the pre-defined perimeter around the physical location of the computing device.

6. The computer-implemented method of claim 1, wherein the notification is selected from the group consisting of: an authorization to access the secured content and a denial of access to the secured content.

7. The computer-implemented method of claim 6, wherein the notification comprises the authorization to access the secured content and the method further comprises: accessing, by the one or more processors, a portion of the secured content via the authentication server.

8. The computer-implemented method of claim 1, further comprising: prior to obtaining the notification, obtaining, by the one or more processors, an access request to access the data structure in the secured area of the memory, wherein the access request does not comprise the encryption key; responsive to the access request, deleting, by the one or more processors, the data structure.

9. The computer-implemented of claim 1, wherein the secured area of the memory is selected from the group consisting of: a portion of Non-Volatile Memory, and Flash backed Dynamic Random Access Memory.

10. A computer program product comprising: a non-transitory computer readable storage medium readable by one or more processors and storing instructions for execution by the one or more processors for performing a method comprising: utilizing, by the one or more processors on a computing device, executing one or more programs of an authentication application, location services executing on the computing device to obtain location data from the location services, wherein the location data indicates a physical location of the computing device contemporaneously with the executing; based on obtaining the location data, creating and encoding, by the one or more processors, a data structure from the location data in a secured area of a memory of the computing device, wherein the data structure is only accessible to the authentication application, wherein the encoding comprises generating an encryption key at a time of storing the location data structure, wherein the encryption key is generated based on timestamp of time of storing the location data structure into the secured area of the memory, and wherein the encryption key is utilized to encrypt the data structure; transmitting, by the one or more processors, to an authentication server, an authentication request, wherein the authentication request comprises the encoded location data, and the authentication request is a request for access to secure content via the authentication server; obtaining, by the one or more processors, from the authentication server, a request to query identifiers geographically proximate to the computing device for additional location information, wherein geographically proximate to the computing device comprises within a pre-defined perimeter around the physical location of the computing device; responsive to the request, querying, by the one or more processors, the identifiers for the additional location information, wherein the additional location information comprises location data originating from each of the identifiers, indicating a location of each of the identifiers, and transmitting the additional location information to the authentication server; obtaining, by the one or more processors, a notification, responsive to the authentication request, from the authentication server; and based on obtaining the notification, erasing, by the one or more processors, the secured area and turning off the location services on the computing device.

11. The computer program product of claim 10, the method further comprising: prior to utilizing the location services, initiating, by the one or more processors, the location services on the computing device.

12. The computer program product of claim 10, wherein the authentication server decodes the encoded location data and compares the decoded location data to the additional location information to determine if the decoded location data and the additional location information indicate locations in a similar geographic area, wherein the similar geographic area comprises the pre-defined perimeter around the physical location of the computing device.

13. The computer program product of claim 12, wherein the decoded location data comprises a latitudinal coordinate and a longitudinal coordinate, describing a position of the computing device comprising the physical location of the computing device.

14. The computer program product of claim 13, wherein the decoded location data and the additional location information indicate locations in a similar geographic area when the latitudinal coordinate and the longitudinal coordinate describing the position of the computing device indicate a location in a virtual polygon defining a geographic area and the additional location information comprises latitudinal coordinates and longitudinal coordinates indicating additional locations in the virtual polygon, wherein a perimeter of the virtual polygon comprises the pre-defined perimeter around the physical location of the computing device.

15. The computer program product of claim 10, wherein the notification is selected from the group consisting of: an authorization to access the secured content and a denial of access to the secured content.

16. The computer program product of claim 15, wherein the notification comprises the authorization to access the secured content and the method further comprises: accessing, by the one or more processors, a portion of the secured content via the authentication server.

17. The computer program product of claim 10, the method further comprising: prior to obtaining the notification, obtaining, by the one or more processors, an access request to access the data structure in the secured area of the memory, wherein the access request does not comprise the encryption key; responsive to the access request, deleting, by the one or more processors, the data structure.

18. A system comprising: a memory; one or more processors in communication with the memory; and program instructions executable by the one or more processors coupled to the memory to perform a method, the method comprising: utilizing, by the one or more processors on a computing device, executing one or more programs of an authentication application, location services executing on the computing device to obtain location data from the location services, wherein the location data indicates a physical location of the computing device contemporaneously with the executing; based on obtaining the location data, creating and encoding, by the one or more processors, a data structure from the location data in a secured area of a memory of the computing device, wherein the data structure is only accessible to the authentication application, wherein the encoding comprises generating an encryption key at a time of storing the location data structure, wherein the encryption key is generated based on timestamp of time of storing the location data structure into the secured area of the memory, and wherein the encryption key is utilized to encrypt the data structure; transmitting, by the one or more processors, to an authentication server, an authentication request, wherein the authentication request comprises the encoded location data, and the authentication request is a request for access to secure content via the authentication server; obtaining, by the one or more processors, from the authentication server, a request to query identifiers geographically proximate to the computing device for additional location information, wherein geographically proximate to the computing device comprises within a pre-defined perimeter around the physical location of the computing device; responsive to the request, querying, by the one or more processors, the identifiers for the additional location information, wherein the additional location information comprises location data originating from each of the identifiers, indicating a location of each of the identifiers, and transmitting the additional location information to the authentication server; obtaining, by the one or more processors, a notification, responsive to the authentication request, from the authentication server; and based on obtaining the notification, erasing, by the one or more processors, the secured area and turning off the location services on the computing device.

* * * * *